(12) United States Patent
Kim et al.

(10) Patent No.: US 11,431,253 B2
(45) Date of Patent: Aug. 30, 2022

(54) LARGE CAPACITY BIDIRECTIONAL ISOLATED DC-DC CONVERTER AND CONTROL METHOD THEREOF

(71) Applicant: HYUNDAI MOBIS Co., Ltd., Seoul (KR)

(72) Inventors: Won Gon Kim, Yongin-si (KR); Deok Kwan Choi, Yongin-si (KR); Kang Min Kim, Seoul (KR); Min Heo, Seongnam-si (KR); A Ra Lee, Seongnam-si (KR); Tae Ho Bang, Seoul (KR); Hyun Woo Shim, Suwon-si (KR); Du Ho Kim, Yongin-si (KR); Soo Min Jeon, Yongin-si (KR); Ji Hoon Park, Suwon-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 0 days.

(21) Appl. No.: 17/139,483

(22) Filed: Dec. 31, 2020

(65) Prior Publication Data

US 2022/0200454 A1 Jun. 23, 2022

(30) Foreign Application Priority Data

Dec. 21, 2020 (KR) .......................... 10-2020-0179562

(51) Int. Cl.
*H02M 3/335* (2006.01)
*H02M 3/158* (2006.01)
*H02M 1/00* (2006.01)

(52) U.S. Cl.
CPC ..... *H02M 3/33584* (2013.01); *H02M 3/1582* (2013.01); *H02M 3/33523* (2013.01);
(Continued)

(58) Field of Classification Search
CPC ........... H02M 3/1582; H02M 3/33584; H02M 3/33523; H02M 3/33538; H02M 1/0003; H02M 1/0048
See application file for complete search history.

(56) References Cited

U.S. PATENT DOCUMENTS 9,061,595 B2 * 6/2015 King ....................... B60L 50/51
9,178,420 B1 11/2015 Hawley
(Continued)

FOREIGN PATENT DOCUMENTS

KR 10-1520257 6/2015
KR 10-1923317 11/2018

*Primary Examiner* — Yusef A Ahmed
(74) *Attorney, Agent, or Firm* — H.C. Park & Associates, PLC (57) ABSTRACT

A Low-voltage DC-DC Converter (LDC) includes a new bidirectional isolated LDC, in which two converters with different power circuit topologies operate in parallel in order to enable both buck mode and boost mode. The two applied converters are a phase-shift full-bridge converter with full-bridge synchronous rectification and an active-clamp forward converter. According to the present invention, it is possible to achieve the advantages of both a phase-shifted full-bridge converter with full-bridge synchronous rectification applied and an active clamping forward converter. Thus, it is possible to minimize output voltage and current ripples, thereby improving the quality of the LDC output power while minimizing electromagnetic waves generated while a product is operating.

4 Claims, 8 Drawing Sheets

(52) U.S. Cl.
CPC ........ *H02M 1/0003* (2021.05); *H02M 1/0048* (2021.05); *H02M 3/33538* (2013.01)

(56) References Cited

U.S. PATENT DOCUMENTS

| | | | | |
|---|---|---|---|---|
| 10,483,862 B1* | 11/2019 | Cook | | H02M 1/44 |
| 2005/0180173 A1* | 8/2005 | Batarseh | | H02M 3/33592 |
| | | | | 363/15 |
| 2006/0109696 A1* | 5/2006 | Ren | | H02M 3/3376 |
| | | | | 363/81 |
| 2007/0115699 A1* | 5/2007 | Yang | | H02M 3/33569 |
| | | | | 363/21.03 |
| 2008/0304292 A1* | 12/2008 | Zeng | | H02M 3/285 |
| | | | | 363/21.12 |
| 2010/0133912 A1* | 6/2010 | King | | H02M 3/1584 |
| | | | | 307/82 |
| 2010/0136379 A1* | 6/2010 | King | | H01M 16/006 |
| | | | | 429/432 |
| 2010/0141213 A1* | 6/2010 | Iida | | B60L 50/61 |
| | | | | 320/134 |
| 2010/0182803 A1* | 7/2010 | Nan | | H02M 3/33592 |
| | | | | 363/21.02 |
| 2010/0246215 A1* | 9/2010 | Mase | | H02M 1/40 |
| | | | | 363/21.04 |
| 2011/0037319 A1* | 2/2011 | Matsui | | H02M 3/33584 |
| | | | | 307/43 |
| 2012/0043923 A1* | 2/2012 | Ikriannikov | | H02J 1/10 |
| | | | | 320/103 |
| 2012/0299378 A1* | 11/2012 | King | | H02M 3/1584 |
| | | | | 307/18 |
| 2013/0003423 A1* | 1/2013 | Song | | H02M 3/3378 |
| | | | | 363/21.02 |
| 2013/0015821 A1* | 1/2013 | Kim | | H02J 7/0019 |
| | | | | 320/128 |
| 2013/0039104 A1* | 2/2013 | Sharma | | H02M 3/33584 |
| | | | | 363/123 |
| 2013/0063185 A1* | 3/2013 | Ye | | H02M 3/33538 |
| | | | | 327/108 |
| 2013/0063982 A1* | 3/2013 | Ye | | H02M 3/33592 |
| | | | | 363/17 |
| 2013/0063985 A1* | 3/2013 | Ye | | H02M 3/3353 |
| | | | | 363/21.05 |
| 2014/0217826 A1* | 8/2014 | Oguchi | | H02J 3/383 |
| | | | | 307/46 |
| 2015/0055374 A1* | 2/2015 | Yamashita | | H02M 3/337 |
| | | | | 363/17 |
| 2015/0280579 A1* | 10/2015 | Ishigaki | | B60L 50/51 |
| | | | | 307/77 |
| 2015/0303815 A1* | 10/2015 | Chen | | H02M 7/4837 |
| | | | | 363/21.04 |
| 2015/0365003 A1* | 12/2015 | Sadwick | | H02M 3/28 |
| | | | | 363/21.01 |
| 2015/0372499 A1* | 12/2015 | Purcarea | | H02M 7/217 |
| | | | | 307/104 |
| 2016/0016479 A1* | 1/2016 | Khaligh | | H01F 38/08 |
| | | | | 363/17 |
| 2016/0072393 A1* | 3/2016 | McIntyre | | H02M 3/33584 |
| | | | | 363/21.1 |
| 2016/0124478 A1* | 5/2016 | Beeston | | G06F 1/26 |
| | | | | 713/300 |
| 2016/0181925 A1* | 6/2016 | Chiang | | H02M 3/33584 |
| | | | | 363/17 |
| 2017/0012547 A1* | 1/2017 | Jitaru | | H02J 3/00 |
| 2017/0170739 A1* | 6/2017 | Chiang | | H02M 3/33592 |
| 2017/0187189 A1* | 6/2017 | Abido | | H02J 3/381 |
| 2017/0288556 A1* | 10/2017 | Tang | | H02M 1/36 |
| 2017/0358996 A1* | 12/2017 | Higaki | | H02M 3/33584 |
| 2018/0130398 A1* | 5/2018 | Chun | | G06F 13/12 |
| 2018/0241313 A1* | 8/2018 | Goto | | H02M 3/33592 |
| 2019/0028035 A1* | 1/2019 | Choi | | H02M 1/32 |
| 2019/0058408 A1* | 2/2019 | Hao | | H02M 5/4585 |
| 2019/0148973 A1* | 5/2019 | Kim | | H02M 3/33584 |
| | | | | 320/109 |
| 2019/0222139 A1* | 7/2019 | Elsayad | | H02M 7/497 |
| 2019/0312521 A1* | 10/2019 | Cao | | H02M 5/4585 |
| 2019/0348833 A1* | 11/2019 | Sun | | B60L 53/22 |
| 2020/0014306 A1* | 1/2020 | Riar | | H02J 7/0063 |
| 2020/0136524 A1* | 4/2020 | Chen | | H02M 7/53871 |
| 2020/0212816 A1* | 7/2020 | Sun | | H02M 1/083 |
| 2020/0212817 A1* | 7/2020 | Sun | | H02M 3/33584 |
| 2021/0122255 A1* | 4/2021 | Liang | | B60L 53/22 |
| 2021/0155100 A1* | 5/2021 | Khaligh | | B60L 53/22 |

\* cited by examiner

LARGE CAPACITY BIDIRECTIONAL ISOLATED DC-DC CONVERTER AND CONTROL METHOD THEREOF

CROSS-REFERENCE TO RELATED APPLICATION

This application claims priority from and the benefit of Korean Patent Application No. 10-2020-0179562, filed on Dec. 21, 2020, which is hereby incorporated by reference for all purposes as set forth herein.

BACKGROUND

Field

Exemplary embodiments relates to large-capacity bidirectional electrically-isolated DC-DC converters (LDC), and control methods thereof.

Discussion of the Background

A DC-DC converter, in other words a Low-voltage DC-DC Converter (LDC), which is a DC power supply device applied to eco-friendly vehicles (HEV, PHEV, EV, FCV, etc.) by replacing an alternator of the internal combustion engine, is an essential device that receives high voltage battery power (e.g., 180V to 450V) from a vehicle to charge a low voltage battery (e.g., 12V) or that supplies power necessary for electrical components. The LDC is used to relieve the burden on the engine to increase fuel efficiency and to handle the increasing electric load.

The LDC components are largely composed of a power conversion component at a high voltage stage, a power conversion component at a low voltage stage, and a magnetic component responsible for power transfers and electrical insulation between a high voltage and a low voltage.

The conventional LDC has a one-way function of receiving power from a high-voltage battery (HVB) in a vehicle and outputting power at a low voltage (e.g., 12V) level through an internal power conversion process.

In recent years, vehicles' electric loads have been increasing (4 kW grade) in response to user demand, and a bidirectional LDC capable of power transfers from a power source of a low voltage battery (e.g., 12V) to a high voltage stage is required. That is, there is a need for a bidirectional LDC capable of not only a power transfer (buck) from the high-voltage stage to the low-voltage stage, which is function of the conventional unidirectional LDC, but also a power transfer (boost) from the low-voltage stage to the high-voltage stage.

When such a bidirectional LDC is applied to a vehicle, various functions such as charging a high-voltage DC link capacitor (therefore, it is possible to delete an initial charging circuit of the existing high-voltage DC link capacitor), charging the high voltage battery in case of an emergency (which allows a temporary protection to over-discharge of the high voltage battery), and self-diagnosing the low voltage battery (detection of over-discharge, deterioration, etc.) are possible, and hence there are various advantages compared to the case of applying only the existing unidirectional LDC.

The above information disclosed in this Background section is only for enhancement of understanding of the background of the invention and, therefore, it may contain information that does not constitute prior art.

SUMMARY

As described above, power capacity needs to expand due to the increased vehicle electrical load in response to the recent demands from users, and an LDC (boost-type) with a boost function for transferring low-voltage power (e.g., a 12V battery) to a high-voltage stage is required in addition to the existing unidirectional isolated LDC (buck-type). The present disclosure provides a new LDC to satisfy the requirements of such a large-capacity bidirectional isolated LDC.

Additional features of the invention will be set forth in the description which follows, and in part will be apparent from the description, or may be learned by practice of the invention In order to solve the above problems, the present disclosure provides a new bidirectional isolated LDC, in which two converters with different power circuit topologies operate in parallel in order to enable both a buck mode operation (4 kW or more) and a boost mode operation (1.2 kW or more). The two converters are respectively a phase-shift full bridge converter with full bridge synchronous rectification, and an active-clamp forward converter.

The phase-shift full bridge converter with full bridge synchronous rectification applied may reduce (with a low cost) the voltage rating specifications of power semiconductor devices used in high and low voltage stages by half, compared to other topologies. As the output voltage (or current) frequency becomes twice in regard to the switching frequency, the size and capacity of passive elements (inductors, capacitors, etc.) of the output stage may be effectively reduced while minimizing semiconductor power loss. In addition, it is possible to implement a bidirectional converter capable of transferring power to the high voltage side by receiving low voltage power using an inductor applied to the low voltage stage in a topology structure. However, since a greater number of power semiconductors is required than for other topologies and the maximum switching duty of power semiconductors is limited to 50% or less, if the converter's input voltage (high voltage) fluctuation range is wide, it is difficult to get the maximum output in the entire input voltage fluctuation range.

In addition, the active-clamp forward converter may minimize the number of power semiconductors used compared to other topologies (and thus achieve a low cost), and since the maximum switching duty of the power semiconductor device can be set to 50% or more (up to 75% or more) even when the converter's input voltage (high voltage) fluctuates widely, the maximum output is possible over the entire range of input voltage fluctuations. However, when the output capacity of the converter is increased, it is difficult to embody a large capacity, and the semiconductor power loss is relatively large compared to other topologies, so there is a disadvantage in terms of efficiency.

The LDC proposed by the present disclosure is an LDC of a new structure to which a parallel operation structure of two converters is applied to take advantage of both converters described above. In addition, it is possible to minimize the voltage and current ripple output from the converter by appropriately controlling a difference in switching time of the power semiconductor elements when the two converters are operating, thereby improving the quality of the LDC output power while minimizing electromagnetic waves generated while the product is operating.

The configuration and operation of the present disclosure will become more apparent through specific embodiments described with reference to the drawings.

It is understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

The above and other aspects, features, and advantages of certain embodiments will be more apparent from the following detailed description taken in conjunction with the accompanying drawings, in which.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Advantages and characteristics of the present embodiment and methods for addressing the same will be clearly understood from the following embodiments taken in conjunction with the annexed drawings. However, the present disclosure is not limited to the embodiments and may be realized in various other forms. The embodiments are only provided to more completely illustrate the present disclosure and to enable a person having ordinary skill in the art to fully understand the scope of the present disclosure, and the scope of the present disclosure is defined only by the claims. In addition, terms used herein are for describing the embodiments and are not intended to limit the present disclosure. In the present specification, a singular expression includes a plural expression unless the context clearly indicates otherwise. It should be further understood that the terms "comprises" or "comprising" used in this specification specify the presence of stated features, integers, steps, operations, elements, and/or components but do not preclude the presence or addition of one or more other features, integers, steps, operations, elements, components, and/or groups thereof.

Hereinafter, preferred embodiments of the present disclosure will be described in detail with reference to the accompanying drawings. In the description of the embodiment, when a detailed description of a related known configuration or function may obscure the subject matter of the present disclosure, a detailed description thereof will be omitted.

Figure 1:
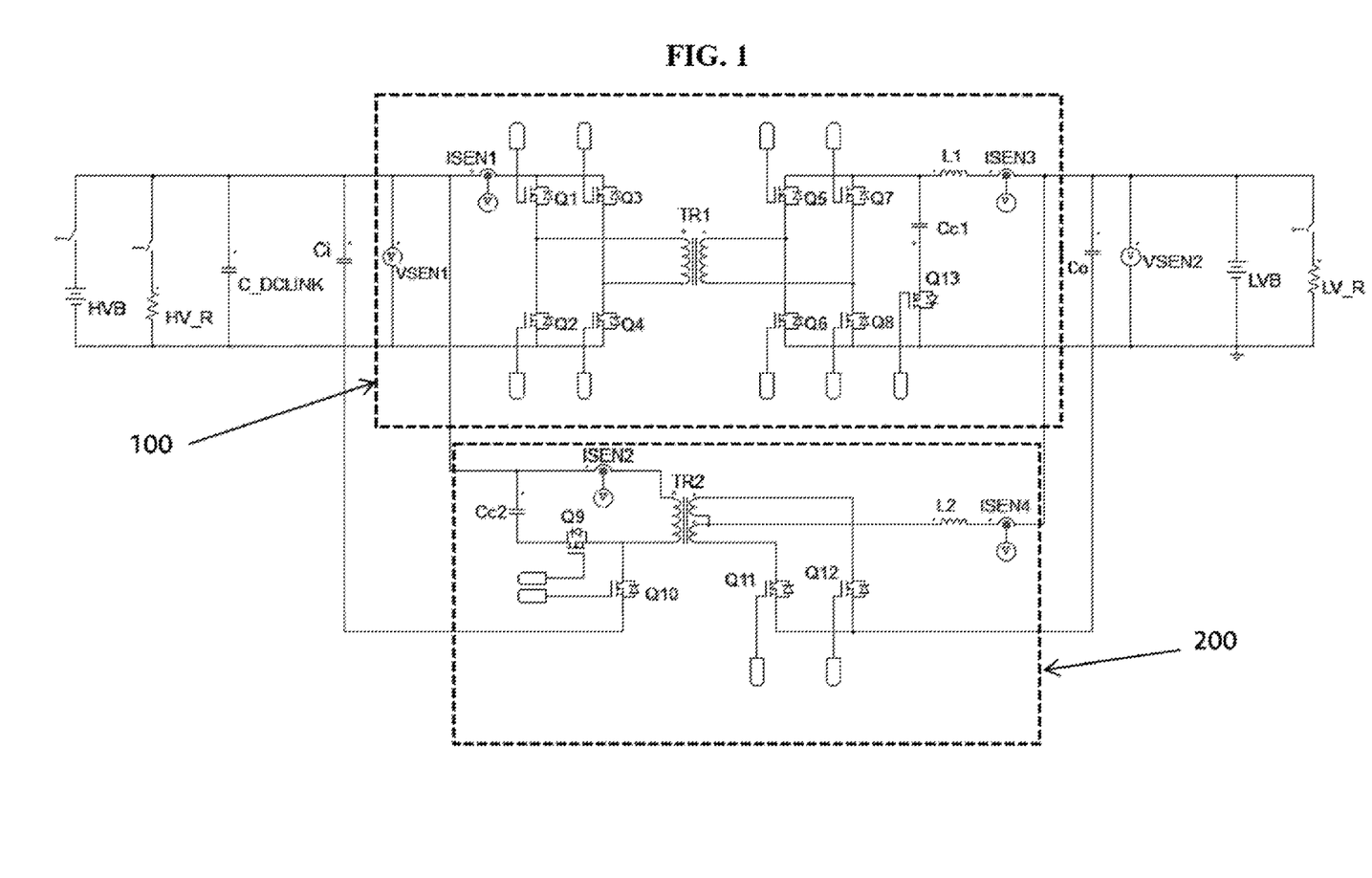
FIG. 1 is a circuit diagram of a large-capacity isolated DC-DC converter (LDC) capable of bidirectional power transfer according to an embodiment of the present disclosure.

FIG. 1 is a circuit diagram of a large capacity isolated DC-DC converter capable of bidirectional power transfer according to an embodiment of the present disclosure.

1. First, representative components of each unit will be described.

HVB: High voltage battery installed in a vehicle

C_DCLINK: DC link capacitor connected to a high voltage output stage of an LDC

HV_R: External load emulation resistor connected to a high voltage output stage in a boost mode operation LVB: Low-voltage battery installed in a vehicle (e.g., 12V)

LV_R: External load emulation resistor connected to a low voltage output stage when operating in a buck mode operation 100: Bidirectional isolated converter (buck/boost converter)

Buck mode operation: HV (phase-shift full bridge: Q1 to Q4)→LV (full-bridge synchronous rectifier: Q5 to Q8)

Boost mode operation: LV (current-fed active-clamp full bridge: Q5 to Q8, Q13)→HV (full-bridge rectifier: Q1 to Q4)

200: Unidirectional isolated converter (buck converter)

Buck mode operation: HV (active-clamp forward)→LV (synchronous rectifier)

2. Components of the bidirectional isolated converter 100 are as follows.

- Q1 to Q4: High voltage (HV) power semiconductors. Converts high voltage DC to high voltage AC. Rectifies high voltage AC to high voltage DC in boost mode.
- TR1: Transformer. Converts power between high voltage AC and low voltage AC, and electrically insulates high voltage and low voltage stages.
- Q5 to Q8: Low voltage (LV) power semiconductor. Rectifies low voltage AC to low voltage DC. Converts low voltage DC to low voltage AC in boost mode
- Q13: Operates as a low voltage (LV) power semiconductor switch to reduce voltage stress to Q5 to Q8
- L1: Inductor. Smooths output voltage in a buck mode, stores and transfers boost power energy in boost mode
- Ci: High voltage (HV) capacitor (smooths input voltage)
- Co: Low voltage (LV) capacitor (smooths output voltage)
- Cc1: Clamp capacitor. Reduces stress to drain-to-source voltage of power semiconductors Q5 to Q8 in a boost mode operation
- VSEN1: Voltage sensor of high voltage stage
- ISEN1: Current sensor of high voltage stage
- VSEN2: Voltage sensor of low voltage stage
- ISEN3: Current sensor of low voltage stage 3. Components of the unidirectional isolated converter 200 are as follows.

Figure 2:
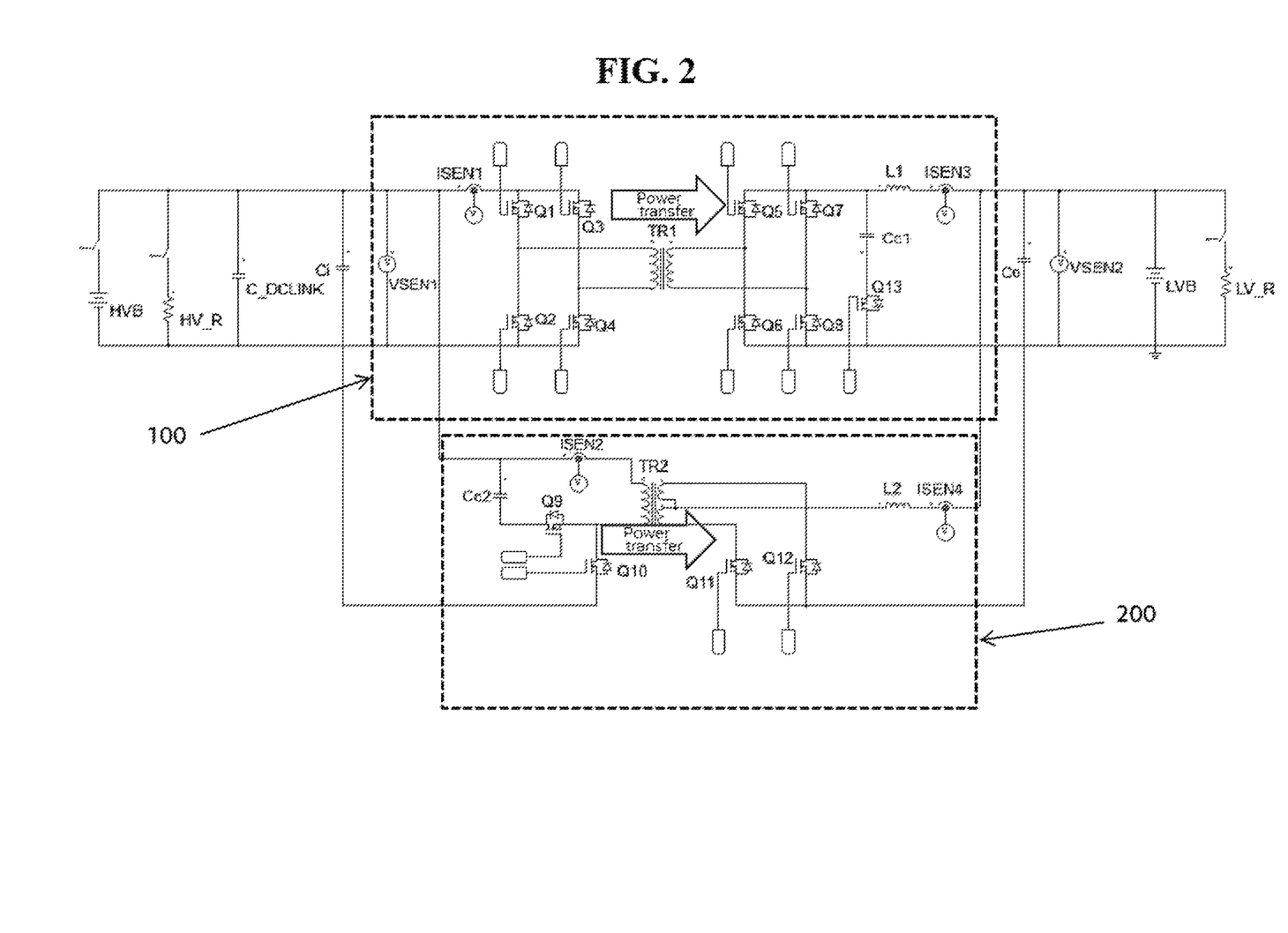
FIG. 2 is a circuit diagram for explaining a buck mode operation.

- Q9, Q10: High voltage (HV) power semiconductor. Converts high voltage DC into high voltage AC
- TR2: Transformer. Converts power from high voltage AC to low voltage AC, and electrically insulates high voltage stage and low voltage stage
- Q11, Q12: Low voltage (LV) power semiconductor (operated as a synchronous rectifier)
- L2: Inductor. Smooths output voltage
- Cc2: Clamp capacitor. Reduces stress to drain-to-source voltage of power semiconductor Q1, Q2
- ISEN2: Current sensor of high voltage stage
- ISEN4: Current sensor of low voltage stage Referring to FIG. 2, a buck mode operation will be described. The buck mode operation may be an operation of receiving power from a high voltage stage and outputting the power stepped down to a low voltage (e.g., 12V level) through a power conversion process of an LDC internal circuit. That is, as shown in FIG. 2, in the buck mode operation, the LDC power may be input from a high voltage battery (HVB). When the high voltage is applied to the LDC from the HVB, the two converters, i.e., the bidirectional converter 100 and the unidirectional converter 200, may start simultaneous parallel operation, and the sum of the output power of the two converters may be supplied to a low voltage battery (LVB) and an electric load (LV_R) of the vehicle.

The voltage (or current) output from the LDC should have voltage (or current) ripples as low as possible to improve the power quality and electromagnetic wave characteristics (EMI, EMC, etc.). The output voltage (or current) ripples of the LDC may be minimized by appropriately adjusting a power semiconductor switching start time of each converter when the bidirectional converter 100 and the unidirectional converter 200 are operated in parallel.

In addition, the output power of the bidirectional converter 100 and the unidirectional converter 200 may be controlled by controlling the maximum duty of a switching voltage (PWM) used for controlling each converter's power semiconductor element by the controller. By limiting the maximum output power of each converter according to the output power (maximum duty control), it is possible to minimize a semiconductor power loss of the LDC internal circuit (that is, to maximize the LDC efficiency).

The voltage and current sensing positions of the input and output stages for controlling the two converters are shown in FIG. 2. That is, a high voltage at an input stage of the LDC may be sensed by the voltage sensor VSEN1, and a current flowing in a high voltage circuit may be sensed by the current sensor ISEN1 and used for input current control. In addition, an output voltage from the low voltage stage of the LDC may be sensed by the voltage sensor VSEN2, and an output current flowing in a low voltage circuit may be sensed by the current sensors ISEN3 and ISEN 4 and used to control an output current of each converter.

Figure 3:
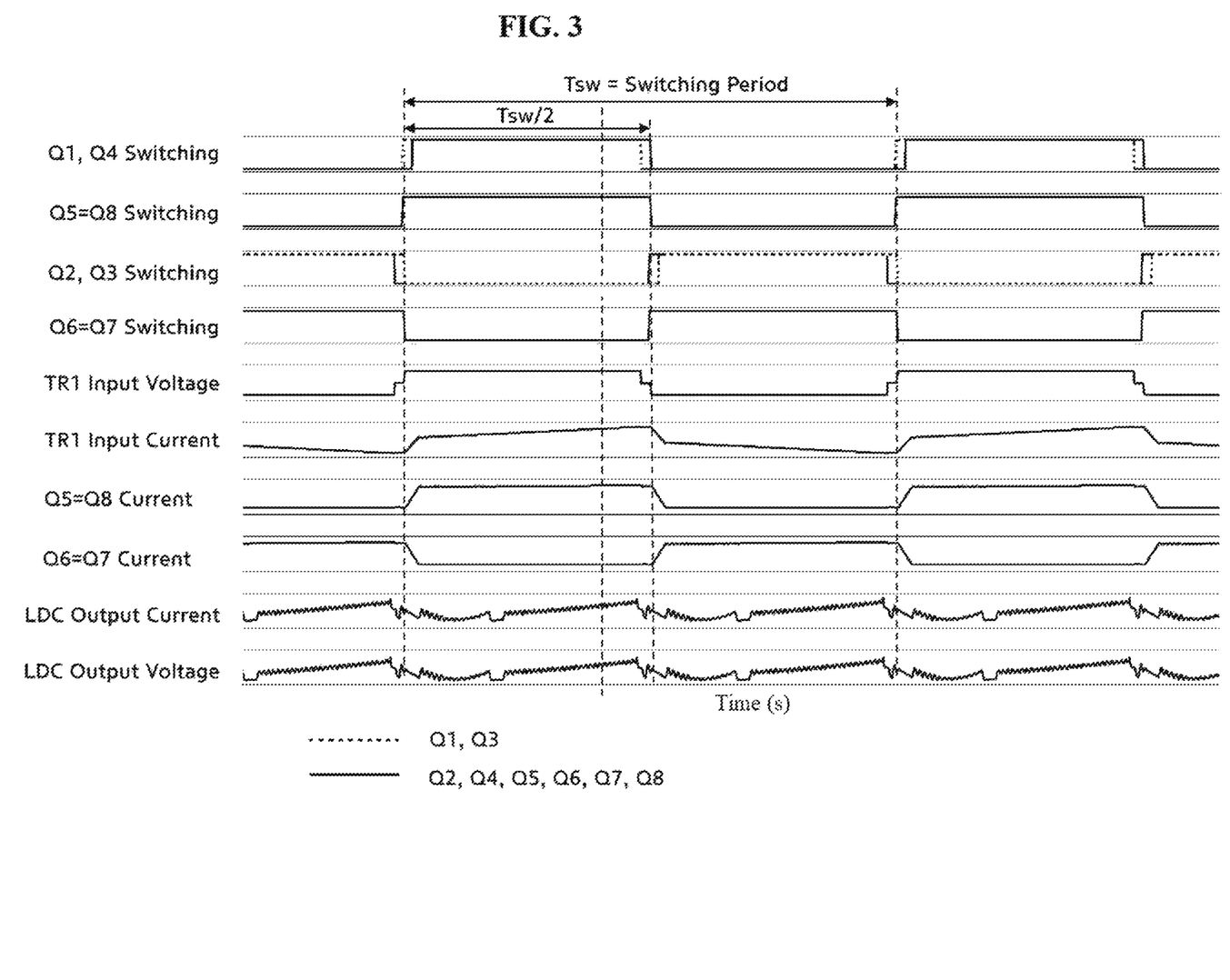
FIG. 3 is a timing chart of operation of each unit when controlling a power semiconductor device of a bidirectional converter (100) in a buck mode operation.

FIG. 3 illustrates a method of controlling power semiconductor devices of the bidirectional converter 100 in a buck mode operation and a timing chart of operation of each component.

Power semiconductors Q1 to Q4 perform a phase-shift full bridge switching operation, and the switching period is Tsw, which is a preset value in the controller. Power semiconductors Q5 to Q8 may be set to perform synchronous rectification switching for maximizing efficiency (therefore, minimizing loss) in consideration of the switching timing of Q1 to Q4.

As shown in FIG. 3, as for an LDC final output current, an operating frequency of the output current may be twice a power semiconductor device switching frequency by phase-shift full bridge switching. (Therefore, the operating period is Tsw/2.) An input voltage/current of a transformer TR1 may be determined by a semiconductor device's switching pattern, which is shown in FIG. 3. Q5 and Q8 may apply a switching signal in a synchronous rectification pattern in order to transfer output power to the output stage with a minimum loss when Q1 and Q4 perform a switching operation. Likewise, Q6 and Q7 may apply a switching signal in a synchronous rectification pattern in order to transfer output power to the output stage with a minimum loss when Q2 and Q3 perform a switching operation.

Figure 4:
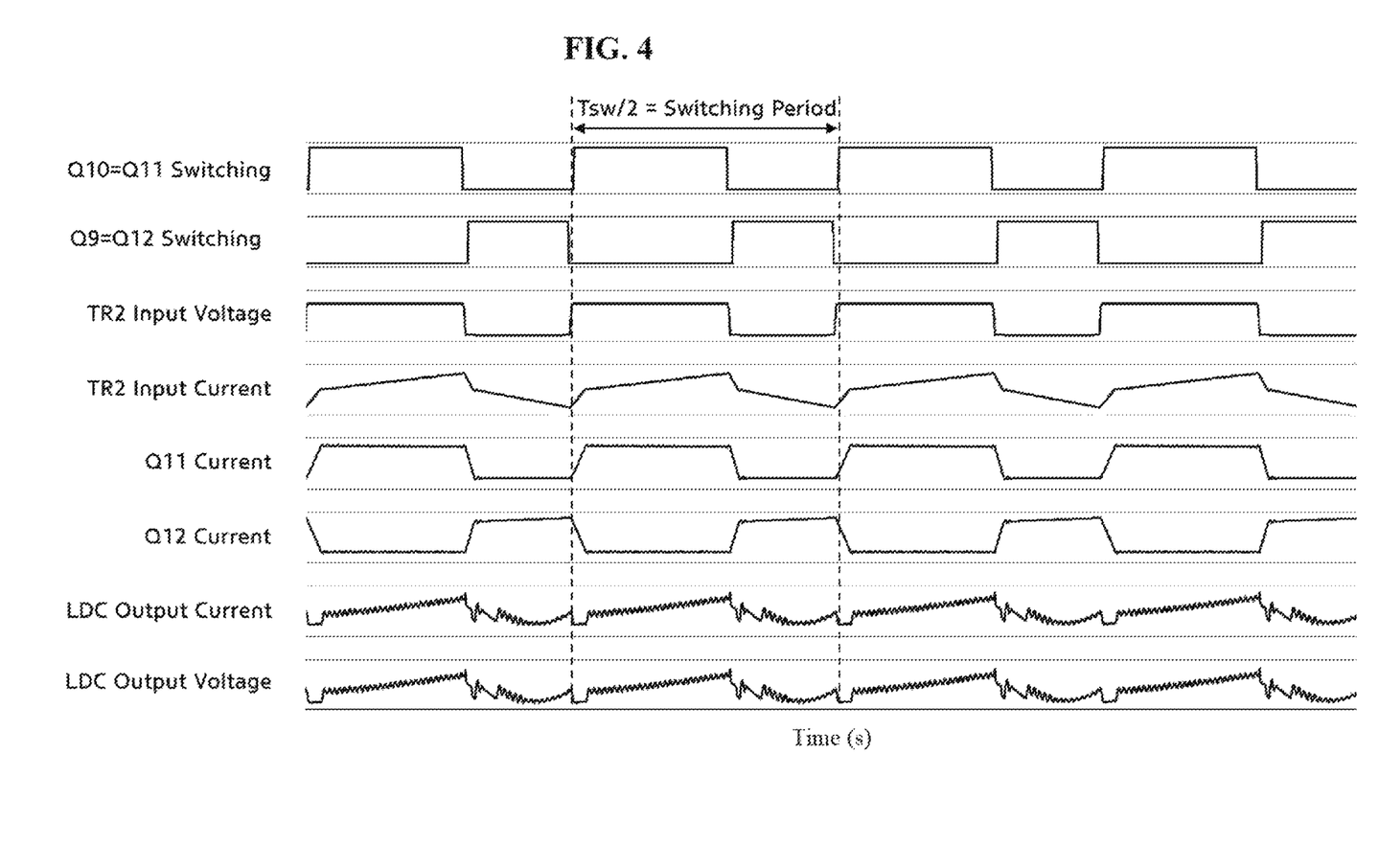
FIG. 4 is a timing chart of operation of each unit when controlling a power semiconductor device of a unidirectional converter (200) in a buck mode operation.

FIG. 4 illustrates a method of controlling a power semiconductor device of the unidirectional converter 200 in a buck mode operation and a timing chart of operation of each component.

The power semiconductor devices Q9 and Q10 may perform active-clamp forward conversion switching. In this case, a switching period may be Tsw/2, which is a value previously set in the controller. The reason for selecting Tsw/2 as the switching frequency is to reduce ripples due to an output voltage (or current) synthesis effect by setting it to the same as the output voltage/current frequency during the buck mode operation of the bidirectional converter 100. The power semiconductor devices Q11 and Q12 on the secondary side of the transformer TR2 may be set to perform synchronous rectification switching for maximizing efficiency (minimizing loss) in consideration of the switching timing of Q9 and Q10.

As shown in FIG. 4, an operating frequency of the LDC output current may be the same as a switching frequency of the power semiconductor devices (the operating period is Tsw/2). An input voltage/current of the transformer TR2 may be determined by the power semiconductor device switching pattern, which is shown in FIG. 4. Q11 and Q12 may apply a switching signal in a synchronous rectification pattern in order to transfer output power to the output stage with a minimum loss when Q9 and Q10 perform a switching operation.

Figure 5:
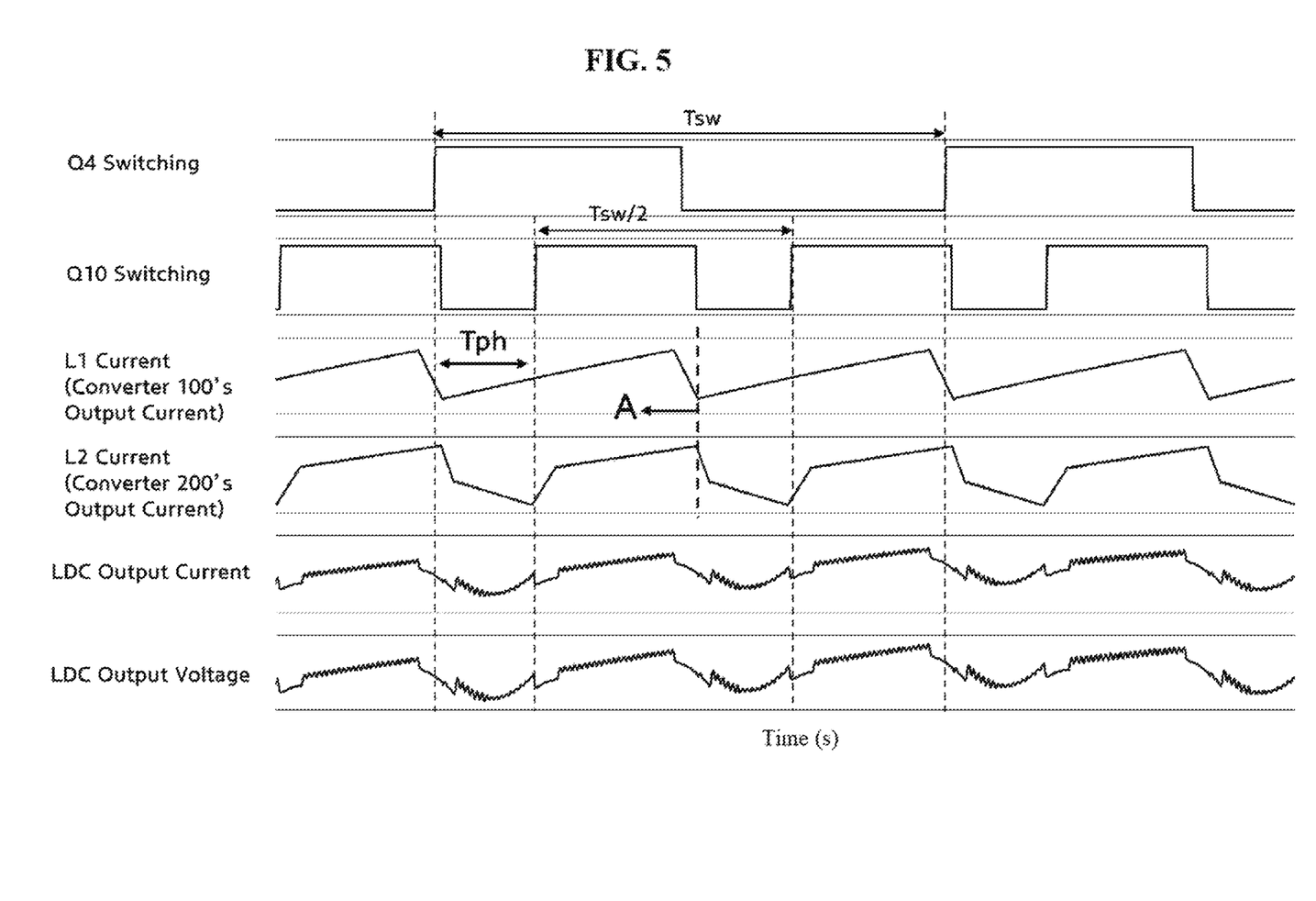
FIG. 5 is a timing chart of operation of each unit when controlling outputs of the bidirectional converter (100) and the unidirectional converter (200) in a buck mode operation.

FIG. 5 is a timing chart of operation of each component when controlling outputs of the bidirectional converter 100 and the unidirectional converter 200 in the buck mode operation.

As shown in FIG. 5, a power semiconductor device switching period of the bidirectional converter 100 may be Tsw, and a power semiconductor device switching period of the unidirectional converter 200 may be Tsw/2. However, a frequency, i.e., a period, of an output voltage (or current) generated by the operation of the bidirectional converter 100 and the unidirectional converter 200 may be equal to Tsw/2.

Tph shown in FIG. 5 represents a difference in switching start time between the bidirectional converter 100 and the unidirectional converter 200. That is, Tph represents a difference between a time at which Q4 switching of the bidirectional converter 100 starts and a time at which Q10 switching of the unidirectional converter 200 starts. When the switching signal is applied at a time interval as much as Tph, a minimum output current point of the bidirectional converter 100 and a maximum output current point of the unidirectional converter 200 may coincide like point (A) as shown in FIG. 5, and, as a result, synthesized output voltage (or current) ripples of the bidirectional converter 100 and the unidirectional converter 200 may be minimized and output. In order to find an optimal value of Tph, previous experimental data according to LDC input voltage and output power may be checked and then used for actual control.

In the buck mode operation, the LDC output power may be determined by the sum of output powers of the bidirectional converter 100 and the unidirectional converter 200, and output power of each converter may be controlled by limiting a maximum switch duty. The output power of each converter may be distributed such that the semiconductor device's power loss may be minimized after checking the previous experimental data, and the distributed output power is used for actual control.

Figure 6:
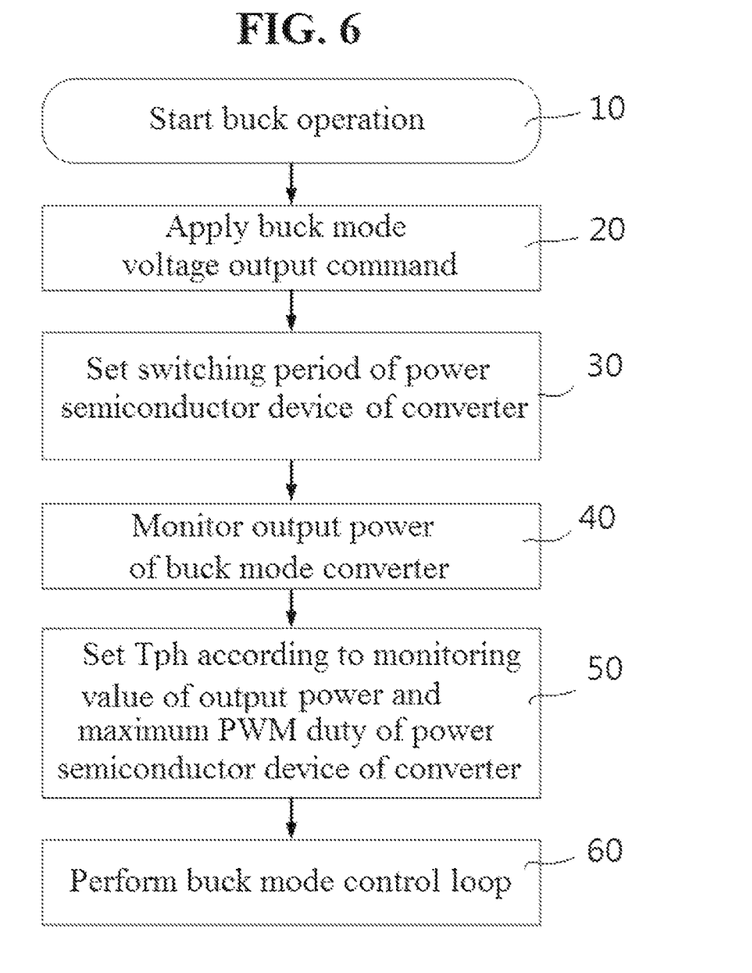
FIG. 6 is a flowchart of a process of setting a switching period, Tph, and a maximum PWM duty of each of the power semiconductors of the bidirectional converter (100) and the unidirectional converter (200) before a control loop operation in a buck mode operation.

FIG. 6 illustrates a process of setting the switching period of the bidirectional converter 100 and the unidirectional converter 200 before a control loop operation during a buck mode operation described so far and also illustrates a process of setting Tph according to the output power and setting a maximum PWM duty of the power semiconductor device.

When the buck mode operation starts in step 10, a buck mode voltage output command may be applied in step 20.

A switching period of the power semiconductor device of the converter may be set in step 30. The switching period may be set using previous experimental data and may be set to Tsw for the bidirectional converter 100 and Tsw/2 for the unidirectional converter 200.

Next, output power of the converters in the buck mode may be monitored in step 40. This may be calculated by sensing a value of an output voltage or current.

Based on the output power monitoring value, Tph (i.e., the difference in switching start time between the converters) and the maximum PWM duty of a power semiconductor device of each converter may be set in step 50. These may be set based on the previous experimental data, as mentioned earlier.

When such a setting process is completed, a buck mode control loop (control of the output voltage and current) may operate in step 60.

Figure 7:
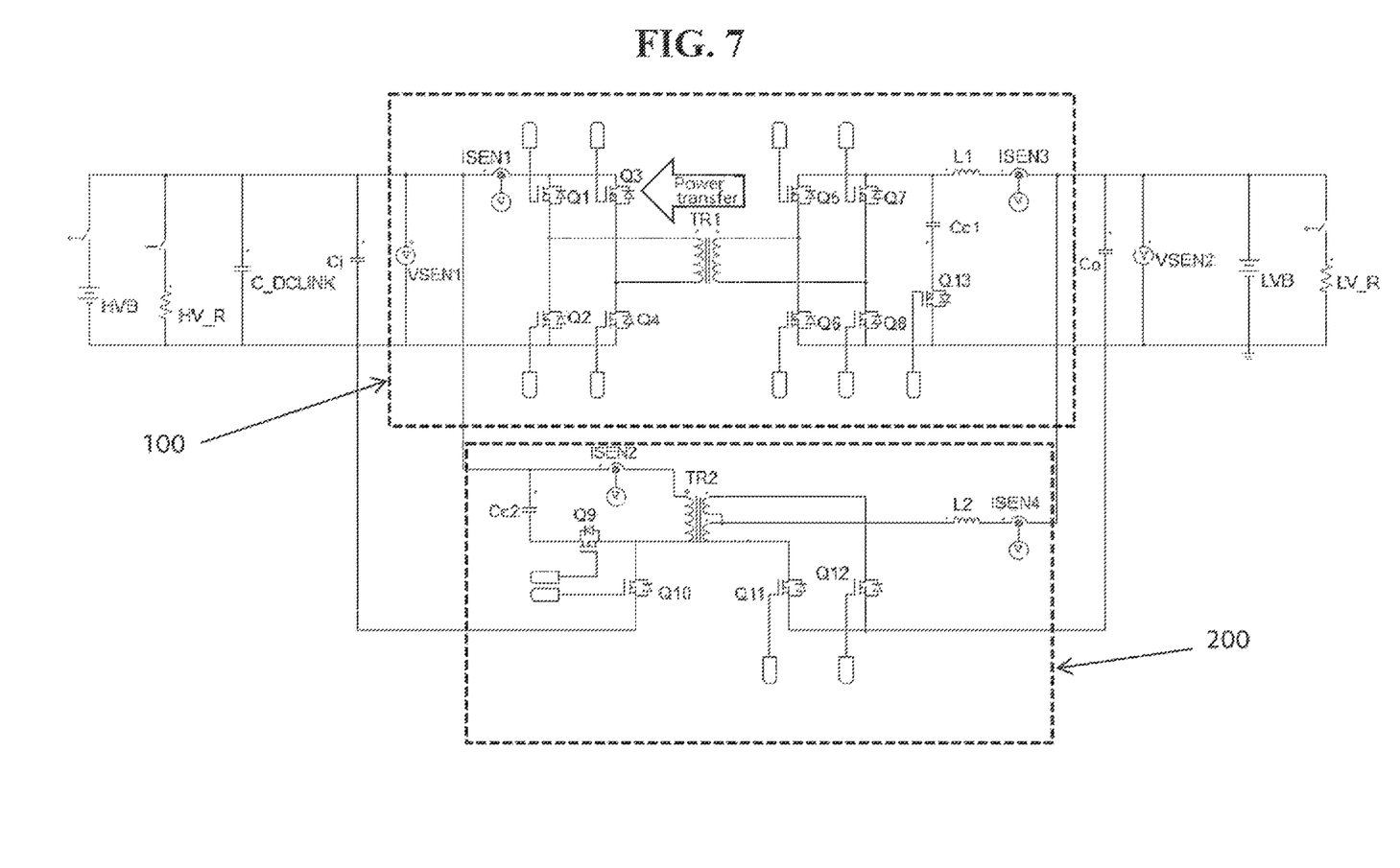
FIG. 7 is a circuit diagram for explaining a boost mode operation.

FIG. 7 is a circuit diagram of a boost mode operation.

As shown in FIG. 7, the boost mode may be an operation mode in which power is received from a low voltage battery (LVB) and transferred to a high voltage stage through a power conversion process of an LDC internal circuit. The boost mode operation may include three operations: ① initial charging of a DC LINK capacitor, ② charging a high voltage battery, and ③ supplying power to a high voltage load according to a type of an output load.

As for ① the initial charging of the DC LINK capacitor, a voltage of a large-capacity capacitor connected in parallel to a high voltage output stage may be charged from an initial voltage of 0V to a target high voltage. As for ② the operation of charging the high voltage battery, when the HVB is over-discharged, a user may temporarily charge the HVB to the target voltage in order to supply a high voltage to the high voltage load of the vehicle. As for ③, the supplying of power to the high voltage load may be performed when there is a need to supply power to a high voltage stage load using power of the LVB rather than power of the HVB.

In the boost mode operation, as shown in FIG. 7, the unidirectional converter 200 may turn off the power semiconductor switches Q11 and Q12 to deactivate the unidirectional converter 200 and may activate the operation of only the bidirectional converter 100. In the boost mode, the operation of the bidirectional converter 100 may be performed in the following process.

First, if the power semiconductors Q5 to Q8 are simultaneously turned on while the LVB is connected, a current flows from an LVB power source to the inductor L1, and accordingly power energy is stored. In this case, an electric potential difference does not occur at a low voltage input side of the transformer TR1, and therefore, no power energy is transferred to the high-voltage stage. If Q5 and Q8=ON, Q6 and Q7=OFF and Q5 and Q8=OFF, Q6 and Q7=ON are implemented after the energy is stored in the inductor L1, a current is injected into the low voltage side of transformer TR1 due to the electric potential difference, thereby causing AC power energy to be transferred to the high voltage side through the transformer TR1. The AC power transferred to the high voltage side may operate the power semiconductor switches Q1 to Q4 as rectifiers so that rectified DC power energy is output to the high voltage output stage to perform a boost operation.

Voltage/current sensing for LDC control in the boost mode may be the same as shown in FIG. 3. The low voltage input to the LDC may be sensed by the voltage sensor VSEN2, and the current flowing in the low voltage circuit may be sensed by the current sensor ISEN3 and used for input current control. In addition, the output voltage of the high voltage stage may be sensed by the voltage sensor VSEN1, and the output current flowing in the high voltage circuit may be sensed by the current sensor ISEN1 and used for output current control.

Figure 8:
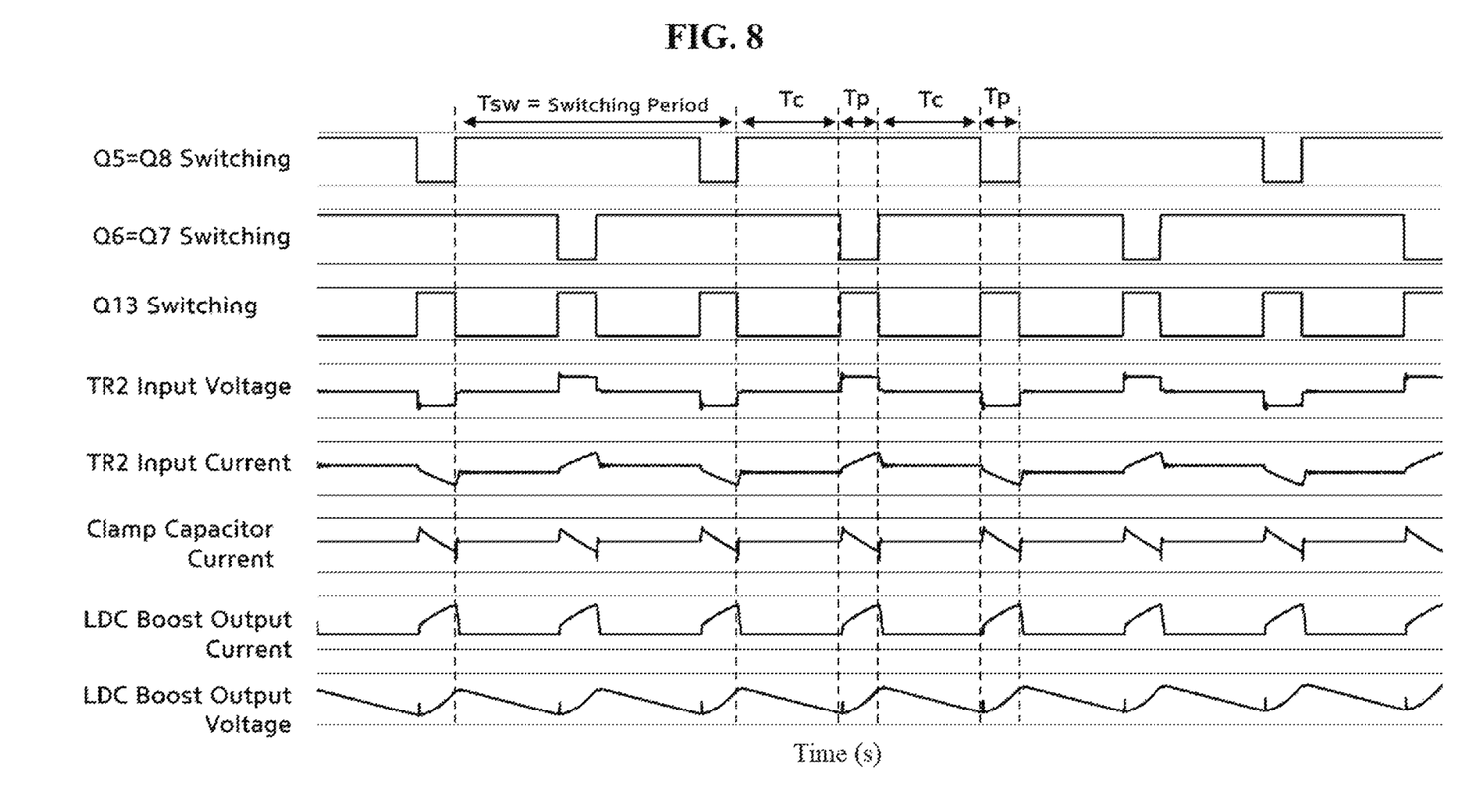
FIG. 8 is a timing chart of operation of each unit when controlling a power semiconductor device of the bidirectional converter (100) in a boost mode operation.

FIG. 8 illustrates a method for controlling a power semiconductor device of the bidirectional converter 100 in a boost-mode operation and a timing chart of operation of each component.

As shown in FIG. 8, the boost mode operation may be divided into two operation sections, a Tc section and a Tp section. The Tc section may be a section in which all power semiconductor devices Q5 to Q8 are turned on and may be a section in which 12V battery energy is stored by the inductor L1. The Tp section may be a power output section in which energy stored in the inductor L1 is transferred to the high voltage side and may be a section in which Q5=Q8=ON, Q6=Q7=OFF, Q5=Q8=OFF, and Q6=Q7=ON are implemented during a Tsw switching section. In the Tp section, the switching device Q13 and the clamp capacitor Cc1 may be used to reduce a surge of the drain-to-source voltage of Q5 to Q8, which is generated during switching.

When the device Q13 is turned on, a voltage clamped by a clamp capacitor voltage may be generated when switching to a drain-to-source voltage of Q5 to Q8.

By applying the switch Q13 and the capacitor Cc1, the voltage spec of the power semiconductors Q5 to Q8 may be reduced by about ½ compared to the case where the power semiconductors Q5 to Q8 are not applied, so it is advantageous to apply the switch Q13 and the capacitor Cc1 in terms of material cost. AC power output to the transformer output side (the high voltage side) in the Tp section may output an LDC boost output current to the high voltage stage, as shown in FIG. 8, by rectification of the power semiconductor devices Q1 to Q4. The boost output current may become twice the switching frequency of the power semiconductors Q5 to Q8 by the rectification of Q1 to Q4, which contributes to reducing the boost output voltage (or current) ripples. In this case, for the rectification of Q1 to Q4, all the power semiconductors Q1 to Q4 may be turned off and operated as diode rectifiers. For the purpose of improving efficiency, a synchronous rectification switching operation of the power semiconductor devices may be also applicable.

According to the present disclosure, it is possible to achieve the advantages of both a phase-shifted full bridge converter with full bridge synchronous rectification applied and an active-clamping forward converter. Thus, it is possible to minimize the voltage and current ripple output from the converter by appropriately controlling a difference in switching time of the power semiconductor elements when the two converters are operating, thereby improving the quality of the LDC output power while minimizing electromagnetic waves generated while the product is operating. In response to the trend of increasing electromagnetic wave regulations required for LDC that minimizes ripples of the converter's output voltage and current, it is possible to provide a good solution to meet the electromagnetic wave standard (the effect of removing an EMC filter).

In addition, a vehicle LDC requires a highly efficient operation for the purpose of improving vehicle fuel efficiency. When the LDC proposed in the present disclosure is applied, the maximum output of each of the two converters is appropriately limited (limited to the maximum duty) according to the LDC output power, and accordingly, it is possible to have an effect capable of operating at the optimal point of efficiency by minimizing a device power loss during the LDC operation.

Although embodiments of the present disclosure have been described in detail hereinabove, it should be understood that many variations and modifications of the basic inventive concept herein described, which may be apparent to those skilled in the art, will still fall within the spirit and scope of the embodiments of the present disclosure as defined in the appended claims. Accordingly, it should be understood that above-described embodiments are essentially for illustrative purposes only but not in any way for restriction thereto. In addition, the scope of the present disclosure should be determined by the appended claims and their legal equivalents rather than the detailed description, and various alterations and modifications within the definition and scope of the claims are included in the claims.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. A large capacity bidirectional isolated DC-DC converter, comprising:
 a high voltage stage having a high voltage battery;
 a low voltage stage having a low voltage battery;
 a bidirectional converter configured to, in buck mode, step down a voltage of the high voltage stage and transfer the stepped-down voltage to the low voltage stage, and, in boost mode, step up a voltage of the low voltage stage and transfer the stepped-up voltage to the high voltage stage; and
 a unidirectional converter connected in parallel with the bidirectional converter and configured to, in the buck mode, step down a voltage of the high voltage stage and transfer the stepped-down voltage to the low voltage stage and to, in the boost mode, be deactivated,
 wherein the bidirectional converter is formed as a phase-shift full bridge converter circuit, and the unidirectional converter is formed as an active-clamp forward converter circuit,
 wherein, in the buck mode, simultaneous parallel operation of the bidirectional converter and the unidirectional converter is performed to transfer a sum of output power of the bidirectional converter and the unidirectional converter to the low voltage stage in order to step down the voltage of the high voltage stage and transfer the stepped-down voltage to the low voltage stage,
 wherein the bidirectional converter, in the buck mode, comprises:
  at least one first power semiconductor configured to perform phase-shift full bridge switching with respect to a voltage of the high voltage stage;
  a transformer configured to step down the voltage switched by the at least one first power semiconductor, transfer the stepped-down voltage to the low voltage stage, and electrically insulate the high voltage stage from the low voltage stage; and
  at least one second power semiconductor configured to perform synchronous rectification switching with respect to a voltage output from the transformer and provide a result to the low voltage stage, and
 wherein the bidirectional converter, in the boost mode, comprises:
  at least one third power semiconductor configured to perform active-clamp full bridge switching with respect to a voltage of the low voltage stage, the transformer configured to step up the voltage switched by the at least one third power semiconductor, transfer the stepped-up voltage to the high voltage stage, and electrically insulate the low voltage stage and the high voltage stage; and
  at least one fourth power semiconductor configured to perform full bridge rectification switching with respect to a voltage output from the transformer and provide a result to the high voltage stage, wherein the unidirectional converter, in the buck mode, comprises:
  at least one first power semiconductor configured to perform active-clamp forward conversion switching with respect to a voltage of the high voltage stage;
  a transformer configured to step down the voltage switched by the at least one first power semiconductor, transfer the stepped-down voltage to the low voltage stage, and electrically insulate the high voltage stage from the low voltage stage; and at least one second power semiconductor configured to perform synchronous rectification switching with respect to a voltage output from the transformer and provide a result to the low voltage stage, and wherein, in the buck mode, a power semiconductor switching period of the bidirectional converter is twice a power semiconductor switching period of the unidirectional converter.

2. The converter of claim 1, wherein, in the buck mode, a power semiconductor switching start time of the bidirectional converter and a power semiconductor switching start time of the unidirectional converter are different.

3. A method of controlling a large capacity bidirectional isolated DC-DC converter which comprises a bidirectional converter configured to, in buck mode, step down a voltage of a high voltage stage and transfer the stepped-down voltage to a low voltage stage and to, in boost mode, step up a voltage of the low voltage stage and transfer the stepped-up voltage to the high voltage stage; and a unidirectional converter connected in parallel with the bidirectional converter and configured to, in the buck mode, step down the voltage of the high voltage stage and transfer the stepped-down voltage to the low voltage stage, the method comprising:

in the buck mode, performing simultaneous parallel operation of the bidirectional converter and the unidirectional converter to transfer a sum of output power of the bidirectional converter and the unidirectional converter to the low voltage stage in order to step down the voltage of the high voltage stage and transfer the stepped-down voltage to the low voltage stage; and in the boost mode, causing the bidirectional converter to step up voltage and deactivating the unidirectional converter in order to step up the voltage of the low voltage stage and transfer the stepped-up voltage to the high voltage stage, wherein:

in the buck mode, the bidirectional converter:

performs phase-shift full bridge switching with respect to a voltage of the high voltage stage, steps down the voltage switched by the phase-shift full bridge switching and outputting the stepped-down voltage while the high voltage stage is electrically isolated from the low voltage stage, and performs synchronous rectification switching with respect to a voltage output from the transformer and providing a result to the low voltage stage, and in the boost mode, the bidirectional converter:

performs active-clamp full bridge switching with respect to a voltage of the low voltage stage, steps up the voltage switched by the active-clamp full bridge switching and outputting the stepped-up voltage while the low voltage stage is electrically isolated from the high voltage stage, and performs full bridge rectification switching with respect to a voltage output from the transformer and providing a result to the high voltage stage, wherein:

in the buck mode, the unidirectional converter:

performs active-clamp forward conversion switching with respect to a voltage of the high voltage stage, steps down the voltage switched by the active-clamp forward conversion switching and outputting the stepped-down voltage while the high voltage stage is electrically isolated from the low voltage stage, and performs synchronous rectification switching with respect to a voltage output from the transformer and providing a result to the low voltage stage, and wherein, in the buck mode, a power semiconductor switching period of the bidirectional converter is twice a power semiconductor switching period of the unidirectional converter.

4. The method of claim 3, wherein, in the buck mode, a power semiconductor switching start time of the bidirectional converter and a power semiconductor switching start time of the unidirectional converter are different.

* * * * *